UNITED STATES PATENT OFFICE.

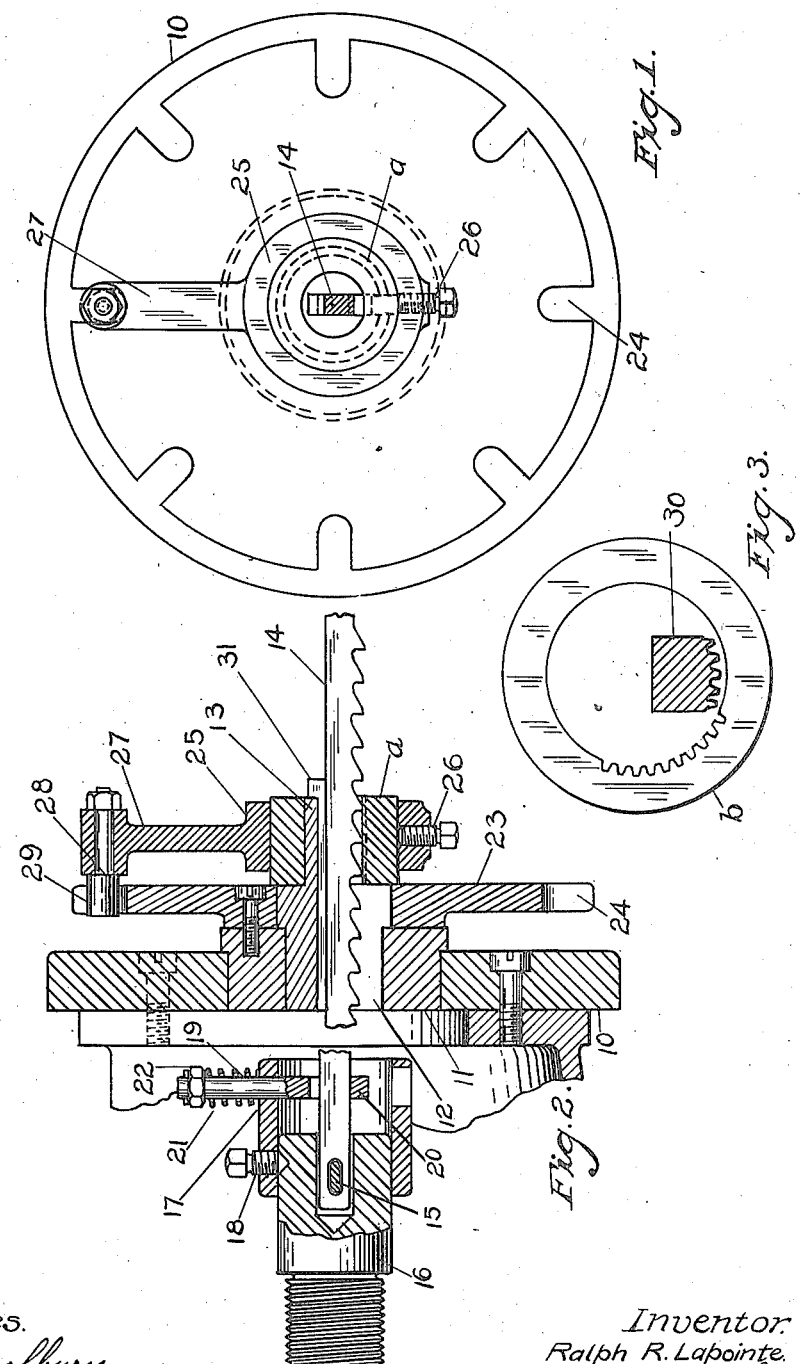

RALPH R. LAPOINTE, OF HUDSON, MASSACHUSETTS, ASSIGNOR TO THE LAPOINTE MACHINE TOOL COMPANY, OF HUDSON, MASSACHUSETTS, A CORPORATION OF MAINE.

INDEXING BROACH MECHANISM.

1,233,373.      Specification of Letters Patent.      Patented July 17, 1917.

Application filed July 27, 1914. Serial No. 853,324.

*To all whom it may concern:*

Be it known that I, RALPH R. LAPOINTE, a citizen of the United States, and resident of Hudson, county of Middlesex, State of Massachusetts, have invented an Improvement in Indexing Broach Mechanisms, of which the following description, in connection with the accompanying drawings, is a specification, like characters on the drawings representing like parts.

The present invention relates to broaching mechanism and particularly to devices adapted to hold a work piece successively in a series of angularly indexed positions, permitting the same to be turned about its center exact predetermined distances for successive operations of the broaching tool, whereby certain operations requiring precision of adjustment such as the production of gears by the cutting of aliquot parts thereof at each stroke. The prime object of the invention is to provide mechanism having a capacity of convenient and quick adjustment of the work piece to successive angular positions, the parts being so arranged that it is practically impossible to set the work piece in any except the accurate position. A further object of the invention is to provide improved means for relieving the broach on the return stroke. The above and other objects and features of the invention will be better understood from the following detailed description taken in connection with the accompanying drawings and will be thereafter pointed out in the appended claims.

Referring to the drawings:

Figure 1 is a front elevation of a broaching mechanism having my improvements embodied therein;

Fig. 2 is a central longitudinal vertical section thereof; and

Fig. 3 is a detail showing a form of broach adapted for the broaching of gears in aliquot parts.

The face plate of the broaching machine is indicated at 10 with a usual reducing bushing 11 set in the central aperture thereof. A second bushing 13 having a work supporting sleeve 13 projected at the front thereof is fitted in the bushing 11, the broach 14 being guided through this inner bushing or work support. The broach 14 has its shank engaged by a transverse key 15 with a connection 16 to the reciprocating working head of the machine (not shown), the seating of the broach shank in the socket in this connection being a slightly loose one for a purpose now to be explained. The connection 16 has a collar 17 fixed thereon by means of a set screw 18, this collar projecting beyond the end of the connection 16 and having an eye bolt 19 transversely slidable therethrough, the eye 20 of which takes around the shank of the broach and there being a coil spring 21 encircling this eye bolt with a backing against the collar 17 and pressing against a nut 22 at the outer end of said bolt with the result that this eye bolt exerts a constant pressure tending to tilt the broach upwardly as seen in Fig. 2 or in a direction to move its teeth away from the work. The purpose of this is as the tapered broach is withdrawn from the work to cause it to be tilted or swung enough so that its teeth will not drag along on the bottom of the cut just made but will clear the same so that the broach will move back freely.

To provide for indexing the work according to my invention, I provide an index plate 23 suitably fixed on the face plate or on the reducing bushing 11 thereof, this index plate having any suitable number of peripheral notches or insets 24 therein, these being shown as eight in number and equally spaced apart. The work piece *a* mounted on the work supporting collar 13 is embraced and clamped by a dog 25, this clamping being shown as effected by a screw bolt 26. The dog 25 has a radial arm 27 equipped with a pin 28 having an inwardly projecting portion 29 adapted to fit within any one of the notches 24 with which it may be selectively engaged. In this way after the dog 25 is once clamped to the work piece and the pin 28 adjusted in one of the notches 29, the first broach cut may be made, and thereafter any required number of succeeding cuts made either one-eighth, one-fourth or one-half a circumference angularly from the first may be cut according as the pin 28 is set into the next or one of the succeeding notches 24. This capability of exact angular adjustment of the work piece with reference to the broach is valuable and useful in various kinds of operations such as the cutting of multiple key ways in gears and hubs, but it finds a peculiar and special utility in the cutting of internal gears which are too large or the teeth too deep to be cut complete at a single broaching operation. In this case the broach can be formed as seen at 30 to cut a predetermined aliquot part of a gear at a single operation and then the work piece *b* being turned a precise angular distance from its first position having in mind the total number of teeth in the gear, and the aliquot part thereof already produced, and the work piece is then set in its next position ready for the cutting of the next aliquot part of its teeth. In this way by successive indexing the complete gear is very quickly and economically produced. I preferably provide a wedge element as seen at 31 as the immediate backing of the broach, which is inserted between the back thereof and the adjacent wall of the passage in the work supporting collar 13. This wedge is of course selected with reference to the character of broach and the nature of the cut to be produced and it may be withdrawn after the cut so as to permit a greater freedom of action to the spring 21 in clearing the broach teeth on the return stroke. I am aware that the invention can be embodied as to its several features in other specific forms than that shown and I therefore desire the present form to be considered as illustrative and not restrictive and refer to the appended claims rather than to the foregoing description to indicate the scope of the invention.

Having described my invention, what I claim as new and desire to secure by Letters Patent is:

1. The combination with a broaching machine having a face plate fixed to the bed thereof, of an index plate secured to said face plate and equipped with a series of spaced apart recesses, a broach mounted to pass centrally through said face plate and said index plate, said face plate being equipped with a bushing also passing through said index plate with an extension to constitute a support for the work piece, a broach fitted to operate in said bushing and on a work piece held thereby, and a clamping dog adapted to grip the work and having provision for engagement with any one of said recesses to hold the work in any one of a series of angular positions with relation to the broach.

2. Broaching apparatus, comprising an index plate having a series of equally spaced apart peripheral recesses, a broach mounted for reciprocation and passing centrally through said index plate, and a clamping dog having a collar adapted to slip over the work and equipped with a radial arm having a pin adapted to selectively engage the recesses of the index plate for the purpose stated.

3. Broaching apparatus, comprising an index plate, a work clamping dog having an arm in coöperative relation with said index plate, said arm and said index plate having coöperative means for holding the work in any one of a predetermined series of angular positions, and a broach mounted for reciprocation in operative relation to a work piece clamped by said dog, said broach having its operative portion formed as a gear segment for broaching an aliquot part of a gear at each operative movement.

In testimony whereof, I have signed my name to this specification, in the presence of two subscribing witnesses.

RALPH R. LAPOINTE.

Witnesses:
 PERCY W. OBERG,
 ARTHUR F. RANDALL.